No. 699,826. Patented May 13, 1902.
J. C. SILVEIRA.
RIDGING PLOW.
(Application filed Jan. 20, 1902.)
(No Model.)

Witnesses,
Inventor,
Joseph C. Silveira
By Dewey Strong & Co.
Atty

UNITED STATES PATENT OFFICE.

JOSEPH C. SILVEIRA, OF SAN FRANCISCO, CALIFORNIA.

RIDGING-PLOW.

SPECIFICATION forming part of Letters Patent No. 699,826, dated May 13, 1902.

Application filed January 20, 1902. Serial No. 90,457. (No model.)

*To all whom it may concern:*

Be it known that I, JOSEPH C. SILVEIRA, a citizen of the United States, residing in the city and county of San Francisco, State of California, have invented an Improvement in Ridging-Plows; and I hereby declare the following to be a full, clear, and exact description of the same.

My invention relates to improvements in plows or scrapers which are designed to throw up a ridge or hill as the scraper or plow moves over the ground. It is intended for use particularly in the cultivation of asparagus. The ground is first thoroughly broken up by plowing and harrowing. The asparagus is sown in rows, the latter being about twelve feet apart. It is then covered over with earth and allowed to mature and bleach, much after the manner of celery.

It is the object of my invention to furnish a device which may be moved along between the rows and throw up a continuous ridge or hill, varying the height of the hill as desired.

In California there are asparagus farms or "gardens" along the river-bottoms containing from three hundred to four hundred acres, and it is the purpose of my invention to economize on the cost and labor of tillage of such large tracts.

The invention consists, essentially, of a plow having an extended landside, means by which the latter may be held in the line of draft, a plowshare, bracings between said share and landside by which a rigid structure is obtained, and a moldboard pivotally secured to the share and capable of being inclined either vertically or horizontally, so as to vary the height of the ridge or hill turned up or to increase or decrease the width of the furrow.

It also comprises a tongue or pole pivoted intermediate of its ends to the plow-frame and means by which the inclination of the pole in relation to the line of the landside may be varied, the reasons for which and further details being pointed out more fully hereinafter, having reference to the accompanying drawings, in which—

Figure 2:
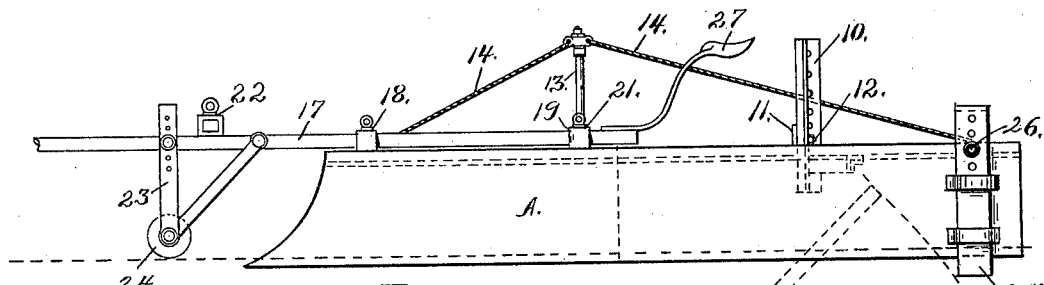
Figure 1:
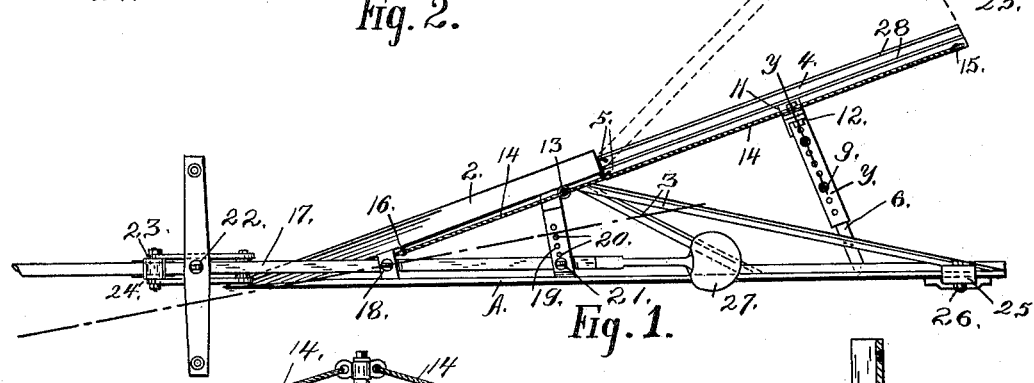
Figure 3:
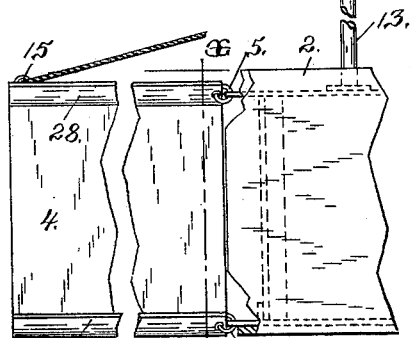
Figure 4:
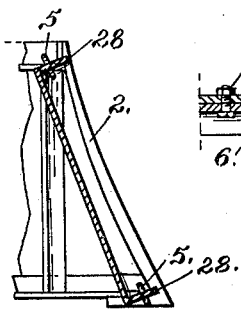
Figure 5:
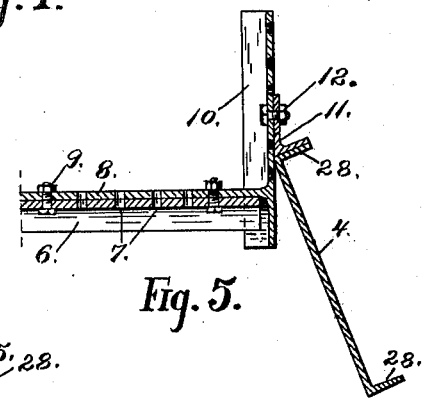

Figure 1 is a top view. Fig. 2 is a side view. Fig. 3 is a side view showing method of securing moldboard to plowshare. Fig. 4 is a section on line $x\ x$ of Fig. 3, showing the same. Fig. 5 is a section on the line $y\ y$ of Fig. 1.

A represents the landside of my hiller or ridger. The forward end unites with the share portion 2, and the two parts are suitably braced by means of the cross-pieces 3 and capable of supporting the operator.

The moldboard 4 is pivoted to the share by suitable means, so that the rear end of the moldboard may be raised or drawn in toward the landside, as desired. In the present instance I have shown the board as connected to the share by means of the links 5, which allow of the necessary horizontal and vertical movement.

An angle-beam 6, secured rigidly to the framework of the apparatus, is provided with perforations 7, and a similarly-perforated bar 8 is slidable on the beams 6 and is secured thereto by a screw or bolt 9. The end of the bar 8 has a vertical perforated bar 10 secured rigidly to it. The moldboard has a perforated projection 11 adjacent to the vertical bar, and the two are united by means of a screw or bolt 12. Thus the bars 6, 8, and 10 and their means of relative adjustment permit the moldboard to be inclined at a greater or less angle in relation to the surface of the ground and also inclined in relation to the landside, thus affording the double means of varying the height of the hill and the width of the furrow. However, in order to relieve the strain on these parts when the moldboard is elevated I may dispose a post 13 upon the rigid framework of the apparatus adjacent to the rear end of the share and from the top of this post run the ends of a chain 14, one end to the back portion of the moldboard, where it is attached at 15, and the other to the front portion of the frame, where it is secured, as at 16.

The pole or tongue 17 is pivoted intermediate of its ends to the apparatus at 18. The rear end of the pole is movable in a guide-strap 19. A series of perforations 20 are made in the latter, and the pole has a perforation adapted to register with the perforations in the guide and receive a locking-pin 21. The whiffletrees are attached to the pole at 22.

A frame 23 carries a wheel 24, by which the point of the plow may be let more or less into the ground.

The apparatus is prevented from sliding, as when the moldboard is turning up the ridge, by means of a vertically-slidable guide or plate 25, carried on the rear end of the landside. The board and plate are perforated, and the plate is held in any desired position by the pin 26. The plate is adapted to project below the lower edge of the landside, whereupon it acts much after the principle of a centerboard of a boat and causes the landside to lie directly in the line of draft.

When it is desired to move the apparatus across the field without turning up the earth, the plate 25 is raised, the wheel 24 is lowered so as to lift the plow-point above the ground, and the pole is swung until it stands so as approximately to bisect the angle inclosed between the landside and share, as shown in dotted lines in Fig. 1.

By changing the pin 21 in the perforations 20, so as to vary the angle of inclination of the pole in relation to the landside, and suitably adjusting the plate 25 the amount of earth thrown up by the moldboard may be regulated.

The moldboard is provided with the lateral flanges 28 upon its outer side, which serve to lift and turn the soil received from the plowshare.

A suitable seat 27 for the operator may be arranged upon the pole, as shown.

Having thus described my invention, what I claim, and desire to secure by Letters Patent, is—

1. The combination in a ridging-plow, of an elongated landside, a vertically-disposed, endwise-adjustable plate or knife carried thereon, a plowshare, and an adjustable moldboard.

2. In a ridging-plow, the combination with the share and landside, of a pivoted moldboard, adapted to have a horizontal movement about its pivots, and means including a vertical bar and a projection adjustable thereon said projection fixed to said moldboard whereby the latter is also capable of a vertical adjustment in relation to the share.

3. The combination in a ridging-plow of an elongated landside, a plowshare, a moldboard pivoted thereto, a transverse beam adjustable in length supported between the landside and moldboard, connections including a vertical extension of one of the members of said beam and a projection on the moldboard said projection and extension adjustable one relative to the other, and means by which the moldboard may be adjustably supported at any desired angle above the ground.

4. The combination in a ridging-plow of an elongated landside, a plowshare, a moldboard pivoted rearward of said share, transverse braces connecting the share and landside, a beam adjustable in length between the moldboard and landside, a vertical projection on said beam and means in connection with said projection by which the moldboard may be engaged.

5. In a ridging-plow, a moldboard having outwardly-extending lateral flanges upon its upper and lower edges, in combination with a vertical projection of one of said flanges, and a member on which the projection is vertically adjustable.

6. In a ridging-plow, a moldboard substantially rectangular in form and having outwardly-extending flange projections upon its upper and lower edges, in combination with a vertical projection of the upper flange and a vertical extension above the moldboard to which the projection is adjustably secured.

7. A ridging-plow consisting in combination of an elongated landside, a vertically-disposed, endwise-slidable knife carried thereon, a share, a rectangular moldboard loosely pivoted at its upper and lower edges rearward of the share, means including a laterally-adjustable beam, a vertically-disposed bar and a projection of the moldboard adjustable on the bar by which said board may be moved vertically or horizontally about said pivots and securely held in any desired position, a pole pivoted intermediate of its ends, and means by which said pole may be held at any desired angle in relation to the landside, a seat upon and movable with said pole and a vertically-adjustable wheel-frame carried on the pole.

In witness whereof I have hereunto set my hand.

JOSEPH C. SILVEIRA.

Witnesses:
S. H. NOURSE,
JESSIE C. BRODIE.